(12) United States Patent
Noth et al.

(10) Patent No.: US 10,039,298 B2
(45) Date of Patent: Aug. 7, 2018

(54) MACHINE, CONTAINER, SYSTEM AND METHOD FOR PREPARING ICE CREAM OR CHILLED DESSERTS ON DEMAND

(71) Applicant: NESTEC S.A., Vevey (CH)

(72) Inventors: Andre Noth, Pully (CH); Youcef Ait Bouziad, Echandens (CH); Alfred Yoakim, St-legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/439,726

(22) PCT Filed: Oct. 30, 2013

(86) PCT No.: PCT/EP2013/072692
§ 371 (c)(1),
(2) Date: Apr. 30, 2015

(87) PCT Pub. No.: WO2014/067987
PCT Pub. Date: May 8, 2014

(65) Prior Publication Data
US 2015/0296831 A1    Oct. 22, 2015

(30) Foreign Application Priority Data

Oct. 30, 2012    (EP) .................................... 12190562

(51) Int. Cl.
*A23G 9/28*        (2006.01)
*A23G 9/12*        (2006.01)
(Continued)

(52) U.S. Cl.
CPC .............. *A23G 9/287* (2013.01); *A23G 9/08* (2013.01); *A23G 9/10* (2013.01); *A23G 9/12* (2013.01);
(Continued)

(58) Field of Classification Search
CPC ... A23G 9/08; A23G 9/10; A23G 9/12; A23G 9/22; A23G 9/287; B65D 1/26; B65D 65/466; B65D 85/78
(Continued)

(56) References Cited

U.S. PATENT DOCUMENTS

2006/0263490 A1    11/2006    Wall et al.

FOREIGN PATENT DOCUMENTS

AU    2011236097    11/2011
EP    2266417    12/2010
(Continued)

OTHER PUBLICATIONS

Russian Office Action—Appl. No. 2015120643 dated Apr. 14, 2017—8 pages.
Russian Office Action—Appl. No. 2015120643 dated Apr. 14, 2017—3 pages (English Translation).
Office Action issued in related Japanese Patent Application No. P2015-538503 dated Aug. 8, 2017 and English translation of same.

*Primary Examiner* — Timothy L Maust
*Assistant Examiner* — Andrew Schmid
(74) *Attorney, Agent, or Firm* — K&L Gates LLP

(57) ABSTRACT

The invention relates to machine for preparing frozen confectionery comprising receiving means (1) forming a seat for accommodating an essentially cup-shaped container (8), said receiving means comprising an heat exchange element (1*a*) having a heat exchange contact surface arranged to be in contact with an heat exchange portion (12) of the container (8) when the container is placed in the machine; wherein said heat exchange element(1*a*) has an inverted conical or curved shape or a plurality of inverted conical sections, or a combination of curved and inverted conical sections. The confectionery produced can be a frozen product such as soft ice or a chilled dessert such as mousse or whipped yogurt.

7 Claims, 4 Drawing Sheets

(51) Int. Cl.
 *A23G 9/08* (2006.01)
 *A23G 9/10* (2006.01)
 *A23G 9/22* (2006.01)
 *B65D 85/78* (2006.01)
 *B65D 65/46* (2006.01)
 *B65D 1/26* (2006.01)

(52) U.S. Cl.
 CPC .............. *A23G 9/22* (2013.01); *B65D 1/26* (2013.01); *B65D 65/466* (2013.01); *B65D 85/78* (2013.01)

(58) Field of Classification Search
 USPC .......................................................... 141/11
 See application file for complete search history.

(56) References Cited

FOREIGN PATENT DOCUMENTS

| | | | |
|---|---|---|---|
| EP | 2266417 A1 * | 12/2010 | ............... A23G 9/08 |
| EP | 2266418 | 12/2010 | |
| EP | 2266418 A1 * | 12/2010 | ............... A23G 9/08 |
| EP | 2508080 | 10/2012 | |
| JP | H03019653 | 1/1991 | |
| RU | 2013741 | 5/1994 | |
| RU | 39 044 | 7/2004 | |
| RU | 2266151 | 12/2005 | |
| RU | 96843 | 8/2010 | |

* cited by examiner

MACHINE, CONTAINER, SYSTEM AND METHOD FOR PREPARING ICE CREAM OR CHILLED DESSERTS ON DEMAND

CROSS REFERENCE TO RELATED APPLICATIONS

The present application is a National Stage of International Application No. PCT/EP2013/072692, filed on Oct. 30, 2013, which claims priority to European Patent Application No. 12190562.4, filed on Oct. 30, 2012, the entire contents of which are being incorporated herein by reference.

FIELD OF THE INVENTION

The present invention is directed to a system for preparing a frozen confectionary such as ice cream or chilled desserts, the system comprises a device and a dedicated container. In particular, the invention relates to a container that serves at the same time as initial container, process container and final container during the preparation of the frozen confection.

BACKGROUND OF THE INVENTION

Currently, the majority of ice cream consumption at home concerns products bought frozen at the point of sales. There are several drawbacks such as the need to transport the products at home rapidly in order to keep them at the frozen state, the need to store them in a freezer and the limited number of flavors available considering standard freezer volume. Additionally, the texture of such product is rather hard and far from the freshly made ice cream.

An alternative solution available today is the use of an ice cream machine to produce fresh ice cream. Thereby, although the obtained texture of the resulting product is more satisfactory, the preparation procedure by means of the known ice-cream machines has several drawbacks.

In particular, all the ingredients must be mixed previously, the volume of such machines corresponds usually to five or more serving portions of the same flavor and the time necessary is about a half an hour. Moreover, the ingredients necessary for the preparation come in contact with a large number of parts of the preparation machine (e.g. a stirrer, tanks, or a dispenser), which all have to be cleaned.

Other alternatives imply a preparation at ambient temperature before the freezing phase in a standard freezer. Hence, they are also time consuming and require cleaning tasks.

US 2006/0263490 relates to a frozen confectionary maker comprising a cup holder for removably receiving a cup with a cavity in its wall and base for receiving freezable solution. The cup of the confectionary maker is designed to serve for the preparation and serving of the cup.

U.S. Pat. No. 7,878,021 relates to an ice-cream maker comprising a blade arranged in a double-walled container, and a housing containing a driving mechanism that can generate a blade-rotating movement in relation to the double-walled container, the double-walled container comprising an external wall and an internal wall defining a housing containing a phase changing mixture having a fusion range extending at least partially below 0° C. The inner wall forms a tub, and the blade having the form of a spoon is used to scrape the inner wall.

AU 2011/236097 relates to a frozen beverage device which comprises a container and sealable cover to convert a liquid, such as a non-alcoholic or alcoholic beverage into an at least semi-frozen slurry containing ice crystals. Thereby, freezing devices comprising, e.g. a cubical or spherical shape and which contain refrigerant, are placed in the container such as to form ice crystals on a deformable wall of the freezing devices. By means of agitation due to shaking, rotating or squeezing the container and/or the cover, at least a partial freezing of the liquid provided within the container is obtained.

WO 2010/149509 relates to a system for preparing a frozen confectionary, the system comprising a cylindrical container designed for being inserted into a dedicated preparation device, said container comprising at least one scraper arranged movable within the container and said container containing ingredients for producing a frozen confection when being cooled and moved. The device of the system comprises a cylindrically formed container holder being equipped with a heat exchange surface designed for being in tight contact with the container when being placed in the container holder.

This system however suffers the drawback that due to the cylindrical shape of the container, effective cooling is strongly dependent on an accurate fitting of the cylindrical container in the container holder of the machine and thus cannot be assured.

Based on the known prior art, an ice cream machine respectively a system is sought after which enables a consumer to eat fresh ice-cream at home, without the necessity to follow the chain of cold and to carry out extensive cleaning steps of the machine. In addition, it is desirable to provide a solution for preparing ice-cream at home in a short time. Further, a solution is sought after which enables effective cooling of the container by the machine.

OBJECT AND SUMMARY OF THE INVENTION

The present invention seeks to address the above-described problems. The invention also aims at other objects and particularly the solution of other problems as will appear in the rest of the present description.

In a first aspect, the present invention relates to a machine for preparing frozen confectionery comprising receiving means forming a seat for accommodating an essentially cup-shaped container, said receiving means comprising an heat exchange element having a heat exchange contact surface arranged to be in contact with an heat exchange portion of the container when the container is placed in the machine; wherein said heat exchange element has an inverted conical or curved shape or a plurality of inverted conical sections, or a combination of curved and inverted conical sections.

The machine according to the invention enables an enhanced and very effective temperature exchange between the heat exchange element and the container when being accommodated in the receiving means of the machine. Thereby, variances in the outer dimensions of the container such as manufacturing tolerances may be compensated by means of the particular geometrical shape of the heat exchange element. Accordingly, an enhanced fitting of the outer container dimensions and the inner dimensions of the heat exchange element and/or the receiving means of the machine is obtained.

In a preferred embodiment, the receiving means is adapted to accommodate a container which is preferably rotational symmetric about a central axis of the body of the container.

The receiving means forming the seat preferably has a shape that is inverted conical or curved beyond the heat exchange contact surface.

The receiving means is preferably adapted for receiving containers of different volumes. For this, the receiving means has a hollow configuration with an opening at the bottom end so that containers of same heat exchange portion but different total height can be received there-through.

The receiving means is preferably only partially composed of the heat exchange element.

The machine may further comprise holding means designed for selectively engaging the container within the receiving means of the machine. The holding means may be designed for selectively engaging with a circumferential upper rim portion of the container. Preferably, the holding means comprise a holding and release portion which is adapted to engage with a circumferential rim portion of the container. Alternatively or in addition, the holding means may comprise vacuum generating means designed to create a vacuum between a bottom portion of the container and the receiving means of the device.

In addition, the machine may further comprise a stirring unit to which stirring means are selectively connectable. The stirring unit of the machine is designed for rotating stirring means within the container connected to the machine. The stirring means may be provided as part of the machine or alternatively may be provided within the container itself. Thereby, the stirring means are preferably shaped to interact with an inner freezing surface of the container.

The stirring means may further comprise an air transmission means for providing air into the product to be stirred within the container.

The machine may further comprise a control unit designed to identify a particular type of container having a predefined volume when being provided to the receiving means of the machine. The control unit preferably comprises sensor means designed to interact with identification means of the container.

The heat exchange element of the machine is preferably integrally formed with the receiving means for the container. The heat exchange element is preferably an evaporator connected to a cooling circuit of the device. Thereby, the heat exchange element is preferably an essentially annular element designed to connect to an outer circumferential heat exchange portion of a dedicated container. The heat exchange portion of the container is preferably made of metal material such as steel or aluminium. The container can be formed entirely of such metal. Alternatively, outside of the exchange portion, the container can be made of heat insulating material such as polymer.

The machine may further comprise a defrost system for facilitating the removal of the container from the machine.

In a second aspect, the invention relates to a single-use container designed for being inserted into a device for preparing a frozen confectionary, the container comprising an at least partly rigid body and a lid member enclosing a compartment and holding a predefined amount of comestible ingredients,
wherein the body comprises an inner freezing surface and a heat exchange portion designed for interacting with cooling means of the device, and
wherein the container is adapted for preparing a frozen confectionary from the enclosed ingredients within the compartment of the container upon cooling of the ingredients by means of the heat exchange portion,
wherein the heat exchange portion of the container has an inverted conical or curved shape or a plurality of inverted conical sections, or a combination of curved and inverted conical sections.

In a preferred embodiment, the container according to the invention is void of piston means arranged for pushing any product in the container towards the bottom of the container.

According to the invention, the provided single-use container provides an initial packaging for a predefined amount of ingredients. Further, the container is also designed for being used as process container, i.e. as container in which the frozen confectionary is prepared, as well as enjoy container, i.e. as container from which the consumer may directly consume the resulting frozen confectionary. Accordingly, there is no need for transferring the frozen confectionary product in an additional receptacle or vessel for consumption.

As the container is used as initial packaging, process container, as well as enjoy container, no cleaning operation of the vessels and/or parts required for the preparation is necessary and thus, the preparation of the frozen confectionary is significantly facilitated.

The term "single-use container" when used in the present invention encompasses any container suitable for being disposed after being used for the preparation of the single-portion of frozen confectionary. Thereby, the containers are preferably recyclable.

The term "frozen confectionary" within this application is intended to refer to different types of frozen or chilled confectionary. Non limiting examples are ice cream, sorbet, sherbet, water ice, frozen yogurt, frozen dairy, soft ice, granitas, Mellorine, frozen custard, non-dairy frozen confection, milk ice, ice lolly, gelato or frozen jelly, or chilled desserts such as mousses, whipped yogurt, milk shakes or smoothie or coffee latté.

The body of the container is preferably a single-wall member forming a cavity for the ingredients. The body of the container is preferably made from metal and/or plastic material. The body may at least be partially made from biodegradable material.

It is preferable that the thickness of the body is small enough to ensure the cooling of the product in an acceptable time. In particular, the thickness of the body is preferably between 0.05 and 5 mm. For example, the thickness of the body is between 70 and 150 microns for an aluminium container. Thereby, sufficient rigidity is preferably provided to the body at least by means of the heat exchange portion.

In a preferred embodiment, the container is rotational symmetric about a central axis of the body of the container.

The container preferably comprises an upper rim portion that is a portion of increased diameter of the container body or a flange-like rim portion.

In a preferred embodiment, the container has a closed bottom, i.e. the container is void of any opening, breakable or removable seals or the like.

The heat exchange portion of the container is preferably integrally formed with the body of the container. It is also preferably of inverted conical or curved shape or a plurality of inverted conical sections, or a combination of curved and inverted conical sections. The heat exchange portion may comprise an annular portion arranged at the circumference of the container. Thereby, the heat exchange portion is preferably made from metal, e.g. from aluminium or steel. In order to provide an effective heat exchange and to reduce the cooling time accordingly the heat exchange portion represents at least 30% of the surface of the body of the container.

More preferably, it represents between 40 and 100% of the surface of the body of the container.

The container preferably comprises a removable or breakable lid member closing the body. The lid member together with the at least partly rigid body of the container encloses a compartment for holding the predefined amount of ingredients.

The lid member of the container may be any means for closing the cavity of the body in which the ingredients are provided. Preferably, the lid member may be a membrane sealed to a top or rim portion of the body of the container. Before usage of the container, the user may remove the lid member by tearing it off the body. Alternatively, the lid member may as well be a re-connectable member having dedicated re-connection means for being re-connected to the body of the container after removal therefrom.

The lid member is preferably of metal such as aluminium and/or of plastic material. In another preferred embodiment, the lid member is of biodegradable material such as cardboard, other natural fibre-based material or starch-PLA.

The ingredients enclosed by the container preferably comprise an ambient shelf-stable confectionary product and optionally also a gas. The ingredients may be present in dry and/or liquid form. Most preferably, the ingredients are liquid. Also, most preferably, no diluent (e.g., water or milk) is necessary to add to the ingredients for the preparation the frozen confectionery.

In a preferred embodiment, the ingredients provide a single portion suitable for preparing a frozen confectionary comprising 50 ml to 500 ml. Thereby, the body of the container is preferably adapted to enclose a specific volume in which a predefined amount of ingredients is provided.

The inner freezing surface of the container is preferably shaped to interact with a dedicated stirring means of the container or the device. In particular, the inner freezing surface is preferably planar in sectional side view.

Further, the inner freezing surface is preferably constituted by the inner surface of the heat exchange portion of the container. Accordingly, effective freezing of the inner surface by means of a dedicated device is enabled.

In a third aspect, the invention relates to a kit of containers which comprises a plurality of different containers which differ at least from each other in their volume which is enclosed by the body of the container. Thereby, all of the containers preferably comprise common parts such as the heat exchange surface and an inner freezing surface. In addition, the containers may comprise a circumferential rim portion designed for being engaged by dedicated connection means of a device to which the container may be connected.

Furthermore, each of the containers preferably comprises at least a portion of equal outer diameter suitable for being connected by the connection means of the device.

In a particular preferred embodiment, the heat exchange portion and in particular its outer form and diameter(s) is/are substantially equal for all of the different containers having different volumes enclosed therein.

Depending on the resulting confectionary product to be prepared within the specific container, the container may comprise a dedicated volume such as for example 150 ml for light aerated desserts, 200 ml for an ice-cream product or 300 ml for a milkshake. The dedicated volume represents the total volume of the container. Preferably, the kit of the invention comprises containers having a three different dedicated volumes of respectively 90 (+/−10) ml, 120 (+/−10) ml and 200 ml (+/−50).

In a preferred embodiment, the container further comprises a stirring member designed for being engaged by a dedicated stirring unit of the device for preparing the frozen confectionary.

The stirring member is preferably specifically positioned within the compartment of the body of the container such that the stirring unit of the device may connect to the stirring member when the container is connected to the device.

The stirring member is preferably designed to be used as process stirring means, i.e. stirring member for the preparation of the product, as well as enjoy spoon, i.e. spoon for consumption of the resulting frozen confectionary.

The container may further comprise identification means which are integrated and/or provided on the container. Thereby, the identification means are designed to provide information regarding the product type and/or further information such as the container volume to a dedicated device. The identification means are preferably designed for interacting with dedicated sensor means of the device.

Preferably, the identification means enables the control unit to adapt the preparation parameters in particular the speed of rotation of the stirring means, the cooling power of the cooling unit and optionally the amount of injected air as a function of the sensed product temperature, optionally the product viscosity and overrun. The control of these parameters may be carried out according to distinct preparation phases depending on the type of product to prepare.

The "cooling power" is generally obtained by adjusting the speed of the compressor and by varying the opening of the expansion valve positioned between the compressor and the evaporator in the cooling circuit.

The identification means may comprise an optical bar code, an RFID tag, embossed structures or other suitable means.

In a further aspect, the invention relates to a method for preparing a frozen confectionery comprising the steps of placing a single-use container containing a predetermined amount of ingredients (non-frozen confectionery product) into receiving means of a dedicated preparation machine, cooling the product within the container to a freezing temperature of the product by means of a heat exchange portion of the container interacting with a heat exchange element of the preparation machine, stirring the product while cooling the product by stirring means connected to the device; wherein the heat exchange portion of the container has an inverted conical or curved shape or a plurality of inverted conical sections, or a combination of curved and inverted conical sections, which is complementary to the shape of the heat exchange element.

According to a preferred embodiment, the container serves at the same time as initial container, process container and final container during the preparation of the frozen confectionary.

In a fourth aspect of the invention, the invention relates to a system comprising a machine as aforementioned and a single-use container as aforementioned, wherein the container is adapted for preparing a frozen confectionery from the enclosed ingredients within the compartment of the container upon cooling of the ingredients by heat exchange between the heat exchange element and the heat exchange portion; wherein the heat exchange portion is complementary to the shape of the heat exchange element.

In a fifth aspect, the invention relates to a method for preparing a frozen confectionery comprising the steps of placing a single-use container containing a predetermined amount of ingredients into receiving means of a dedicated preparation machine, cooling the product within the container to a freezing temperature of the product by means of a heat exchange portion of the container interacting with a heat exchange element of the preparation machine, stirring the product while cooling the product by stirring means connected to the machine; wherein the heat exchange portion of the container has an inverted conical or curved shape or a plurality of inverted conical sections, or a combination of curved and inverted conical sections, which is complementary to the shape of the heat exchange element.

In particular, the container serves at the same time as initial storage container, process container during the preparation of the frozen confectionary and final (i.e., serving) container. The initial storage container is preferably an aseptically filled and hermetically sealed container containing a protective gas such nitrogen.

According to the preferred method, the control unit of the machine identifies an identification means on the container by a sensor means designed to interact with identification means of the container, and adapts the process parameters to a dedicated preparation recipe which is stored in the control unit or directly read from the identification means of the container. Therefore, it is made possible to rapidly prepare a range of different types and volumes of frozen confectionery on demand hygienically and conveniently.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
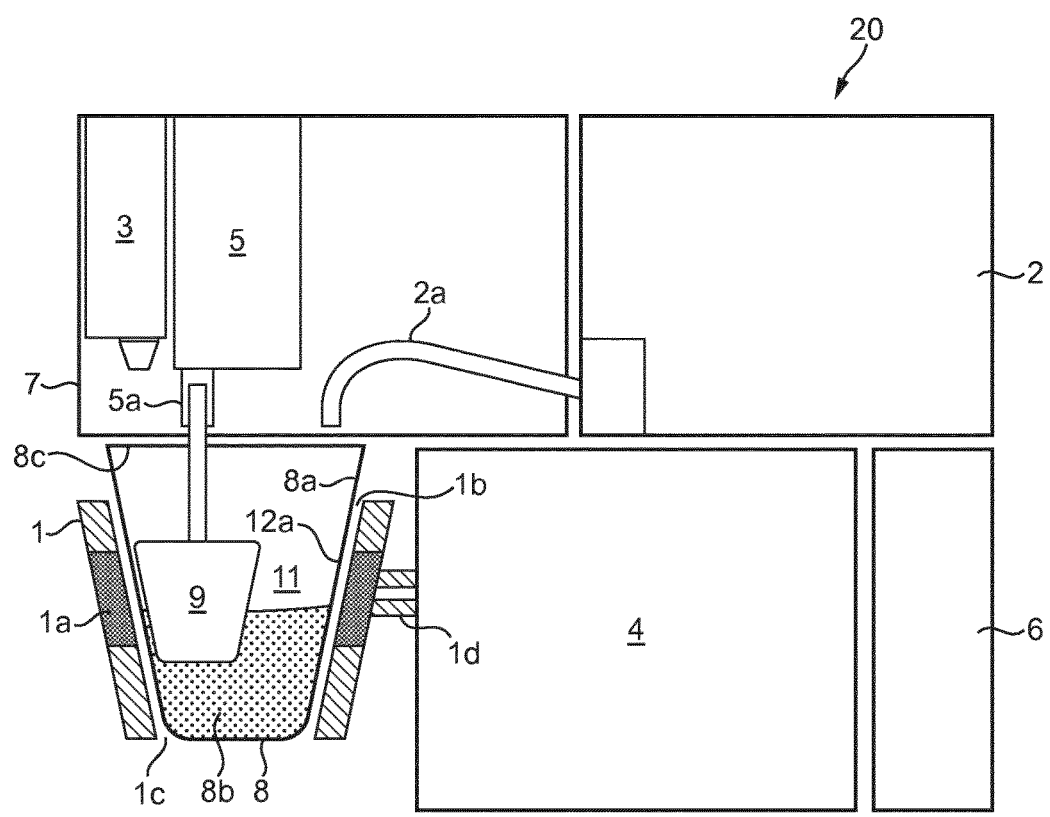
FIG. 1 shows a schematic drawing of the system for preparing a frozen confectionary according to the invention.

FIG. 1 relates to a preferred embodiment of a system according to the present invention comprising a single-use container 8 and a machine respectively a device 20 designed for preparing a frozen confectionary by means of the container 8.

The machine respectively the device 20 preferably comprises receiving means 1 for receiving the container 8 therein. The receiving means 1 are preferably shaped in V- or truncated conical tubular form when seen in sectional side view as indicated in FIG. 1. Thereby, the receiving means 1 preferably comprise an insert opening 1b in which the container 8 may be placed, as well as a lower opening 1c.

Further, the receiving means 8 are preferably formed as an annular ring portion. The receiving means 8 are preferably connected to a housing of the device by dedicated support means 1d. The support means may be simply the inlet and outlet tube of the refrigeration fluid (e.g., gas) or may be separate mechanical reinforcement means such as a rigid rod.

According to such an embodiment, containers 8 of different sizes respectively volumes may be supported by the receiving means 1.

The device further comprises a cooling unit 4 (i.e., a unit generating cold) connected to a heat exchange element respectively cooling element 1a that is preferably connected to or integrally formed with the receiving means 1 of the device 20. The cooling element 1a is preferably an evaporator connected to the cooling unit 4 of the device. The cooling element 1a thus serves as a heat exchanger that withdraws the heat energy from the container 8 and its enclosed confectionary product.

The cooling element 1a is preferably shaped to be adjacent to a heat exchange portion 12 of the container 8 (see FIG. 2a,2b) when the container is placed in the receiving means 1. Thereby, the cooling element 1a is preferably arranged at an inner surface of the receiving means 1. The cooling element 1a and the heat exchange portion 12 of the container 8 are preferably complementary shaped.

The cooling element 1a is further of a material which provides excellent heat transfer properties, such as e.g. metal. Accordingly, the heat transfer between the container 8 and the cooling element 1a is significantly enhanced.

As shown in FIG. 1, the container receiving means 1 are preferably only partially composed of the cooling element 1a. The rest of the receiving means 1 is preferably formed of a material with a lower thermal heat capacity such as e.g. a polymer. According to such an embodiment, the thermal inertia and thus energy losses are reduced, which allows a faster cooling of the container 8.

The cooling unit 4 of the device 20 is adapted to cool the cooling element 1a. Since the cooling element 1a comprises excellent heat conductivity the container 8 and in particular the heat exchange portion 12 of the container 8 when being in touch with the cooling element 1a is cooled. The cooling unit 4 can comprise any refrigeration and/or circulatory heat transfer system to cool the cooling element 1a, the heat exchange portion 12 and consequently the container 8 as rapidly as possible.

Optionally, the device comprises a defrosting system (not shown) in order to minimize the frosting of the cooling element 1a, on the heat exchange portion 12, and/or on the container 8. The defrosting system is for example a hot gas defrost system that can comprise a switchable reversed compressor gas flow valve, a defrosting plate and/or a dry air circulation system with the humidified air. In a particular preferred embodiment, the defrost system comprises a three-way valve being part of the cooling unit 4 designed to bypass a condenser thereof such that hot gases may be directly used for heating the evaporating element 1a.

The device 20 further comprises a liquid tank 2 for holding liquid such as e.g. water and a dedicated pump. The liquid tank 2 is preferably connected to liquid dispensing means 2a for providing liquid to the container 8 when being placed within the receiving means 1a of the device 20.

Furthermore, the device 20 may comprise a topping tank 3 and an associated valve or pump (not shown) for providing toppings in solid or liquid form to the product 8b. The toppings may be liquid coulis, liquid chocolate, caramel or solid products like crisps, flakes, chocolate bits. Additionally, the toppings may be liquefied by means of an additionally provided heating source such as e.g. melted chocolate.

The device 20 further comprises a stirring unit 5 adapted to connect to stirring means 9. For this reason, the stirring unit 5 is preferably equipped with connection means 5a designed for selectively connecting to the stirring means 9. The stirring means 9 may either be part of the device 20 or be provided as integral part of the container 8.

The device 20 further comprises a control unit 6 for controlling the operations of the components of the device. The control unit 6 may further comprise sensors and container recognition means (not shown) which are arranged to interact with identification means provided on the container 8. The control unit preferably controls the rotational speed of the stirring means and the cooling power of the cooling unit 6.

The topping tank 3 and the stirring unit 5 are mounted on a mobile structure 7 of the device in order to allow the insertion and removal of the container 8 into and from the container receiving means 1. The mobile structure 7 is thus adapted to be moved relatively to the rest of a housing of the device 20 from a closing position (shown in FIG. 1) to an open position (not shown). Thereby, the movement of the mobile structure 7 with respect to the rest of the device 20 may be rotation or translation.

In the following, the basic working principle of the device for preparation of frozen confectionary will be explained.

First, the mobile structure 7 of the device 20 is brought into its open position in which a container 8 from which a lid member provided to close a central opening 8c of the container 8 has been removed is inserted in the receiving means 1. In the open position, the stirring means 9 may be manually connected to stirring unit 5 of the device.

The mobile structure 7 is then brought into its closed position in which the stirring unit 5 and the topping tank 3 are lowered towards the container 8. In this position, the stirring means 9 are brought into a position adjacent to the inner freezing surface 12a and the heat exchange portion 12 of the container 8.

The control unit 6 then interacts with the identification means provided on the container 8 for recognizing the container type and/or the volume enclosed by the container 8. The control unit 6 may then adapt the process parameters to a dedicated preparation recipe, which may either by stored in the control unit 6 or be read directly from the identification means of the container.

If the product is in a concentrated form, such as powdered or liquid concentrate, water or other liquid such as milk may be added from the liquid tank 2 into the container by means of the upper opening 8c within the body 8a of the container 8.

Next, the product within the container 1 will be cooled by means of the cooling means 1a interacting with the heat exchange portion 12 of the container 1. Thereby, the stirring unit 5 may provide a motion of the stirring means 9 within the container 8.

Liquid or solid toppings may then be added from the topping tank 3 to the main product within the container 8. This preferably takes place close to the end of the preparation process such that liquid toppings will create an appealing visual swirl for the consumer and solid toppings will remain crispy.

The mobile structure 7 of the device 20 is then brought into its open position such that the container 8 may be removed from the receiving means 1. Thereby, the stirring unit 5 is adapted to disconnect from the stirring means 9 when bringing the mobile structure 7 in an open state.

The stirring means 9 are disconnected from the machine to be left in the final product and thus within the container 8. The stirring means 9 that are preferably shaped like a spoon may then be used for consumption of the prepared confectionary 8b.

The container thus serves at the same time as initial container, process container and serving container during the preparation of the frozen confection. Accordingly, no cleaning operations of the components of the device is necessary.

With the described configuration, the cooling of the product works efficiently. In particular, the transmission of the cold temperature from the cooled surfaces of the cooling means 1a to the liquid or semi-liquid product can be homogenized by rotating the stirring means 9.

Moreover, since only one serving portion is prepared at the same time, the waiting time for the frozen confectionary to be prepared is effectively reduced. In particular, a ready to consume single-portion of frozen confectionary is preferably prepared within 5 minutes.

Figure 2A:
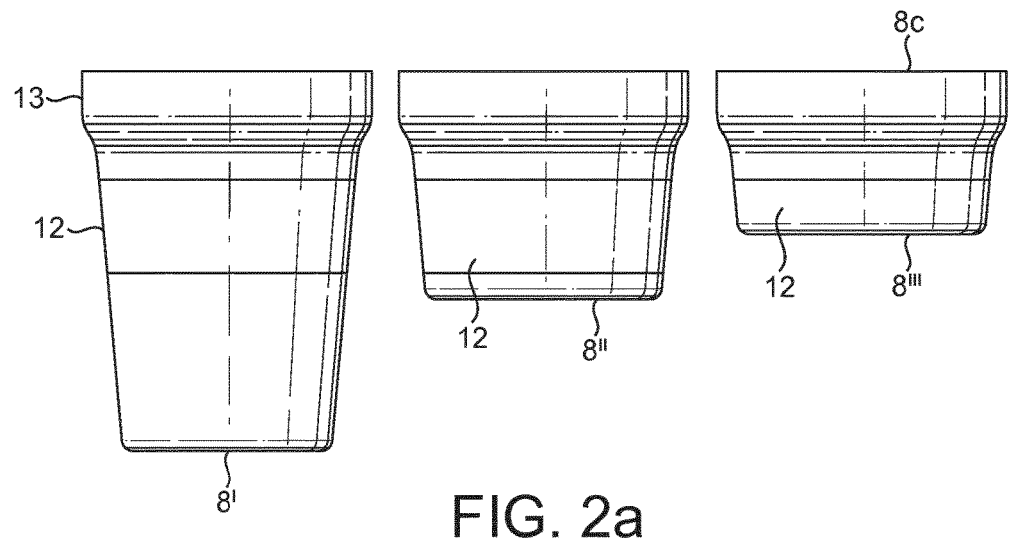
FIGS. 2a and 2b show different shapes of a container body according to the present invention.
Figure 2B:
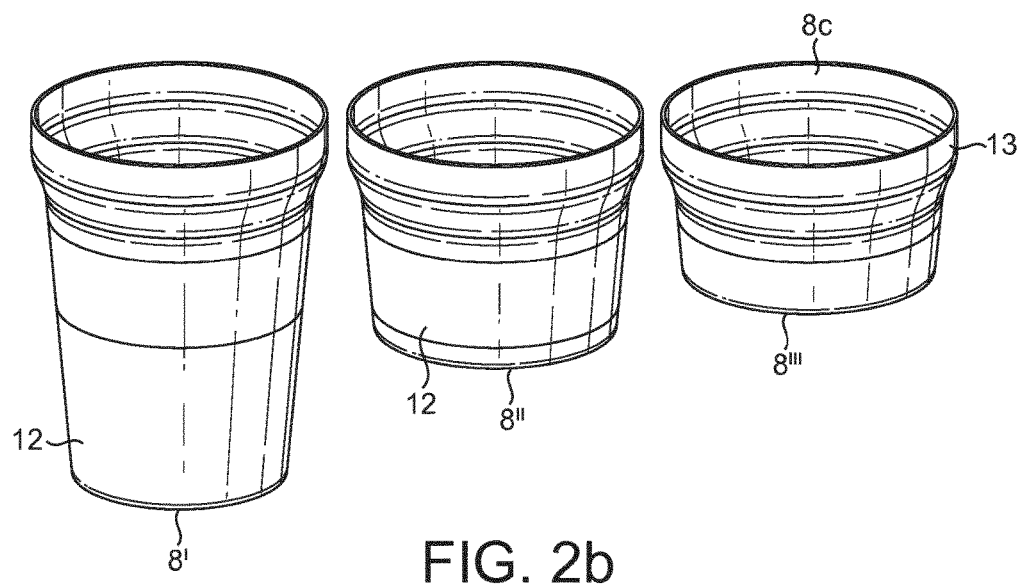

As shown in FIGS. 2a and 2b, different containers 8',8", 8''' may be provided each of which enclose a different volume such as 300 ml, 200 ml or 150 ml.

Dependent on the product to be prepared by the respective container 8, the size and volume of the container 8 is adapted to contain a predefined amount of ingredients necessary for preparing the specific product.

The containers preferably comprise a shelf-stable comestible ingredient. In addition, the container may further comprise a gaseous phase such as e.g. air which is enclosed in the compartment 11 by means a lid member (not shown). In a preferred embodiment the amount of confectionary ingredients preferably ranges from 20 to 60% of the provided volume of the container. However, for drink products with no or low overrun such as smoothie, the amount of confectionary ingredients preferably range from 61% to 95% of the provided volume of the container. In any case, the rest of the container may be filled with gas. For example, nitrogen can be provided within the container for aseptic filling and extended shelf life.

As already mentioned, a lid member (not shown) is preferably provided to each of the containers in order to close off aperture 8c of the container and thus, to enclose the ingredients therein.

As shown in FIGS. 2a and 2b, the different capsules 8',8",8''' all comprise common technical parts, in particular a heat transfer portion 12 as well as an internal cooling surface 12a. Thereby, the heat transfer portion 12 is preferably of essentially identical outer diameter for all of the different containers 8',8",8'''. More preferably, the heat transfer portion 12 is of the same dimensions and shape for all of the different containers 8,',8",8'''.

Figure 3:
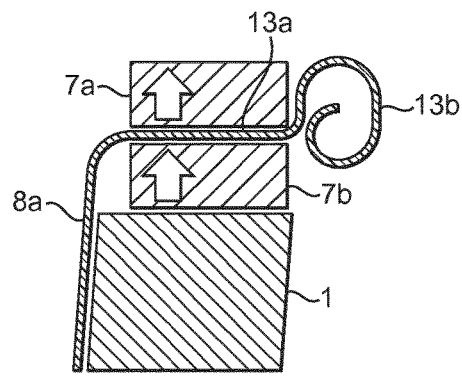
FIG. 3 show a schematic drawing of a preferred embodiment of the fixation means for the container according to the invention.

The containers 8',8",8''' preferably also comprise an upper rim portion 13 which is of essentially identical geometric shape. The upper rim portion 13 may be a portion of increased diameter of the container body 8 as indicated in FIGS. 2a and 2b. Alternatively or in addition, the upper rim portion 13 may comprise a flange-like rim portion 13a as indicated in FIG. 3. Further, a curled outer rim portion 13b may be extending from the flange-like rim portion 13a (see also FIG. 3).

According to such an embodiment, the containers 8',8",8''' are all suitable for being inserted into the receiving means 1 of the device 20.

The container 8',8",8''' may be made of metal material such as steel or aluminium. The container may however be as well made from a polymeric material. The thickness of the preferably single-wall container is thereby chosen to enable an effective cooling of the container.

The thickness of the container body 8a of the different containers 8',8",8'" is preferably identical, but may be different in order to obtain different thermal properties and thus cooling properties for the respective product to be prepared.

The container 8 is preferably equipped with identification means such as a bar code, an RFID tag, protruding embossed structure or the like in order to provide information as to the specific ingredients contained in each of the different containers 8',8",8'".

Each of the containers 8',8",8'" has preferably an essentially truncomical shape with a closed bottom. Alternatively, the container may as well have an essentially curved shape with a closed bottom. Alternatively, the container has a plurality of inverted conical sections, or a combination of curved and inverted conical sections. In the context of the invention, the term "curved shape" relates to the curved shape (or profile) of the container in both the axial and circumferential directions. Acccording to such a shape of the container 8, an extension and/or retraction of the container body 8a due to variation of temperature will not negatively affect the proper support of the container 8 within the receiving means 1 of the device 20. In particular, a tight support between the container 8 and the receiving means 1 and thus a close contact between the heat exchange portion 12 and the cooling means 1a is ensured.

As shown in FIG. 3, the device 20 is further equipped with holding means 7a,7b designed for selectively engaging the container 8 within the receiving means 1 of the device.

The holding means may comprise a holding ring 7a that presses against a flange-like rim portion 13a of the container 8. Thereby, the holding ring 7a may press the rim portion 13a against the receiving means 1 of the device 20 or against a correspondingly shaped release portion 7b provided at the lower surface of the rim portion 13a (as shown in FIG. 3). The holding ring 7a may thus be arranged to be movable relatively to the receiving means 1 and/or the release portion 7b.

Accordingly, after the container 8 is placed into the receiving means 1, the holding ring 7a may contact an upper surface of the rim portion 13a of the container 8, thereby pressing said rim portion against the receiving means 1 and/or a provided release portion 7b (see downward arrow in FIG. 3). Hence, a perfect contact between the container 8 and the receiving means 1 and/or the release portion 7b is ensured.

After preparation of the frozen confectionary in the device 20, the release portion 7b may exert an upward directed force (see upward arrow in FIG. 3) against the rim portion 13a, thereby facilitating the removal of the container 8 from the receiving means 1.

Figure 4:
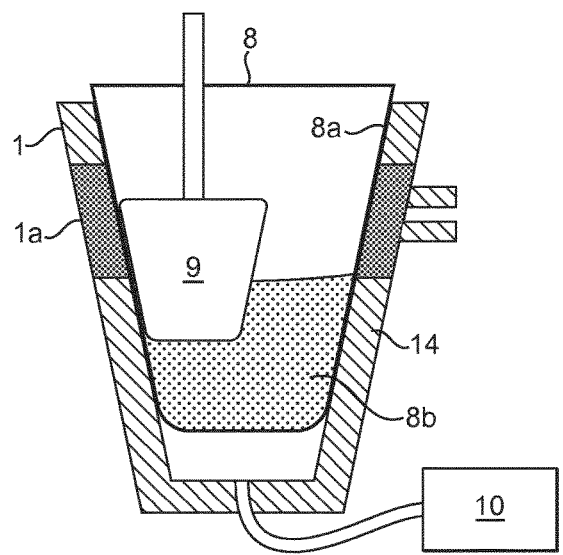
FIG. 4 shows a schematic drawing of another preferred embodiment of the fixation means for the container according to the invention.

In a further preferred embodiment as shown in FIG. 4, the holding means may as well comprise a vacuum generating means 10 designed to create a vacuum between a bottom portion and/or the body 8a of the container 8 and the receiving means 1 of the device 20.

According to such an embodiment, the receiving means 1 comprise a closed bottom portion 14 such as to form a hollow receiving chamber into which the container 8 may be placed. To said bottom portion 14 the vacuum generating means 10 such as an air pump or mechanically driven vacuum means are connected.

Hence, a vacuum or under pressure may be generated after the container 8 is placed in the receiving means 1 in order to fixedly hold the container 8 within the receiving means 1 during the preparation process. After the preparation process, a positive pressure respectively an overpressure may be provided between the bottom and/or body portion 8a of the container 8 and the bottom portion 14 of the receiving means 1 in order to facilitate removal of the container 8 therefrom.

Figure 5:
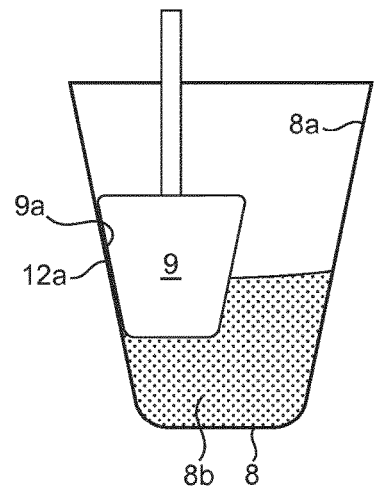
FIG. 5 shows a schematic drawing relating to the possible movements of the stirrer in a preferred embodiment of the system.

FIG. 5 shows a container 8 to which the stirring means 9 in the form of a single stirring member is provided. The stirring member 9 may be manually connected to the stirring unit 5 of the device 20 as previously described. Thereby, connection means 5a such as e.g. magnets or clips may be used for connecting the stirring member 9 to the stirring unit 5 of the device 20.

Alternatively, the stirring member 9 is provided as an integral part of the single-use container 8. Thereby, the stirring unit 5 and the connection means 5a thereof may be designed for automatically contacting the stirring member 9 provided within the container 8. For this reason, the stirring member 9 may for example be fixedly connected to a portion of an inner wall of the container 8 such that a predefined orientation of the stirring member 9 is assured. Accordingly, the connection means 5a of the stirring means 5 of the device may easily contact the stirring member 9 at this predefined position within the container. Alternatively, sensor means such as a CCD camera may be provided for detecting the exact location of the stirring member 9 within the container 8.

The stirring member 9 is preferably a spoon-shaped member.

The stirring member 9 is preferably positioned at the inner freezing surface 12a of the container 8.

The stirring unit 5 of the device 20 is designed for providing a movement of the stirring member 9.

The device 20 may further comprise torque sensing means (not shown) connected to the control unit 6. Thereby, the control unit 6 which is adapted to control the stirring unit 5 and in particular the rotational speed and the electrical current of a dedicated motor thereof, may sense the torque which is proportional to the electrical current. Accordingly, the viscosity of the product to be prepared within the container 8 can be detected by the control unit 6 in order to monitor the preparation process and detect whether the product within the container is ready for consumption.

Figure 6:
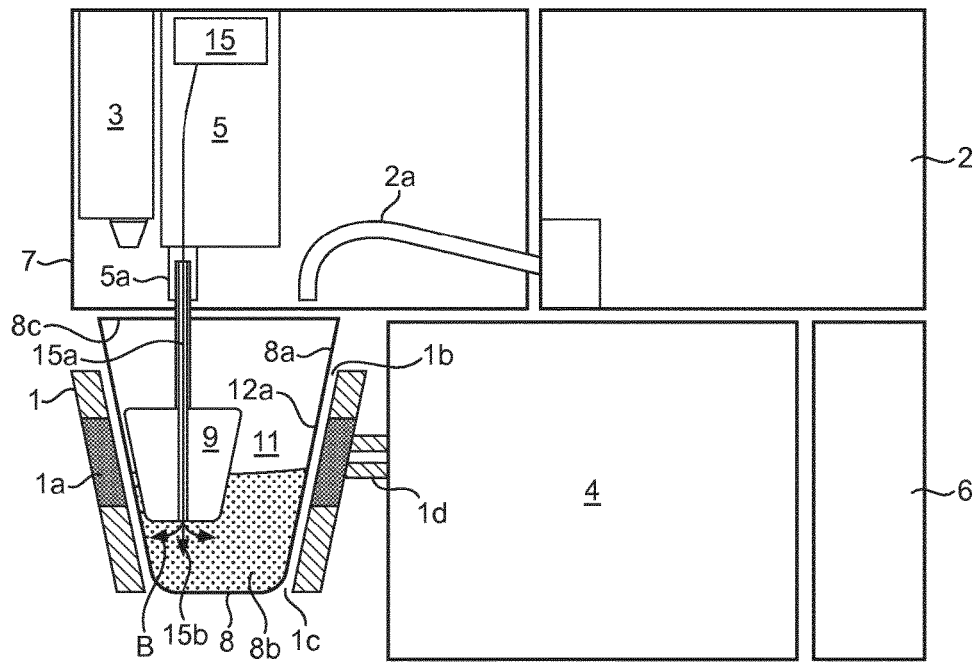
FIG. 6 shows a schematic drawing of another preferred embodiment of the system according to the invention wherein the stirrer is equipped with air guiding means.

FIG. 6 relates to another preferred embodiment of the device 20 and the container 8 placed therein. As shown in this figure, the device 20 may further comprise air injection means 15 which are designed for injection of air into the container 8.

Preferably, the air injection means 15 comprise an air pump connected to the stirring means 5, 9 such that air can be injected through the stirring means 9 into the product 8b (see arrows B). Thereby, the stirring means 9 may comprise an internal air channel 15a and a lower outlet opening 15b for guiding the injected air into a lower bottom portion of the container 8. The lower outlet opening 15b is preferably provided in the centre portion of the stirring means 9. Alternatively the outlet opening 15b may as well be arranged at the side surface of the stirring means 9. Thereby, also a plurality of outlet openings may be provided at the side and/or lower surfaces of the stirring means 9.

According to such an embodiment, improved aeration of the product to be prepared may be obtained.

Figure 7:
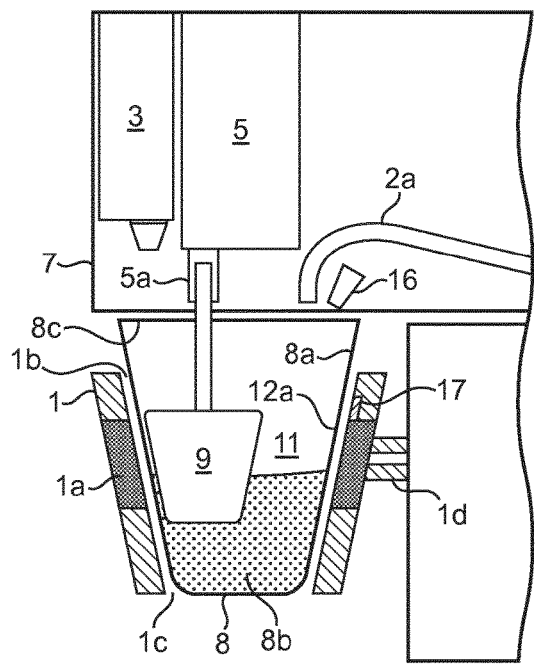
FIG. 7 shows a schematic drawing of another preferred embodiment of the system according to the invention, wherein the device comprises temperature sensing means.

As indicated in FIG. 7, the device 20 may further comprise temperature sensing means 16, 17. Thereby, the sensing means may comprise for example a thermocouple, thermistor or resistance temperature detector 17 which is provided at the receiving means 1. Alternatively or in addition, the temperature sensing means may comprise an infrared temperature sensor 16 designed to directly obtain the temperature of the product 8*b* within the container 8.

The temperature sensing means 16, 17 are preferably connected to the control unit 6 in order to control the cooling unit 4 of the device 20 dependent on the actual temperature of the product 8*b* within the container 8.

The present invention enables the preparation of a frozen confectionary, which can be freshly prepared in single portions within the initial container that serves at the same time as process and enjoy container.

With the present invention it is further possible to prepare several different types of frozen confections in a short time. Since the container is dispensable and does not need to be cleaned, the handling is simplified and the need for cleaning is reduced.

Furthermore, the stirring means provided at the device or initially within the container may be used as spoon in order to facilitate consumption of the resulting product.

Although the present invention has been described with reference to preferred embodiments thereof, many modifications and alternations may be made by a person having ordinary skill in the art without departing from the scope of this invention which is defined by the appended claims.

The invention claimed is:

1. A machine for preparing frozen confectionery comprising a receiving member forming a seat for accommodating a container, the receiving member comprising an annular ring extending from an upper opening to a lower opening, the annular ring is configured to receive containers having different volumes, the annular ring is only partially composed of a heat exchange element having a heat exchange contact surface arranged to be in contact with an heat exchange portion of the container when the container is placed in the machine, the heat exchange element has an inverted conical shape, and a distance from one side of the heat exchange element to an opposite side of the heat exchange element defines a diameter of the heat exchange element that is continuously decreasing from a first end of the heat exchange element to a second end of the heat exchange element opposite from the first end of the heat exchange element such that a first diameter at the first end of the heat exchange element is greater than a second diameter at the second end of the heat exchange element.

2. The machine of claim 1, wherein the receiving member forming the seat has a shape which is selected from the group consisting of (i) inverted conical, (ii) curved, and (iii) curved and inverted conical sections beyond the heat exchange contact surface.

3. The machine of claim 1, wherein the receiving member is adapted to accommodate the container.

4. The machine of machine according to claim 1, wherein the receiving member is adapted for receiving containers of different heights.

5. The machine of claim 1, wherein the machine further comprises a holding member designed to selectively engage with a circumferential upper rim portion of the container extending away from a center axis of the container, the circumferential upper rim portion of the container has (i) an outer rim diameter that is greater than the first diameter of the heat exchange element and greater than the second diameter of the heat exchange element and (ii) an inner rim diameter that is greater than the first diameter of the heat exchange element and greater than the second diameter of the heat exchange element, the holding member configured to move from (i) a holding position where holding member contacts the circumferential upper rim portion of the container to (ii) a releasing position.

6. The machine of claim 1, wherein the annular ring comprises the heat exchange element, an upper opening ring portion and a lower opening ring portion, the heat exchange element abuts the upper opening ring portion and the lower opening ring portion, the upper opening ring portion extends from the upper opening toward the lower opening, and the lower opening ring portion extends from the lower opening toward the upper opening.

7. The machine of claim 6, wherein the circumferential upper rim portion of the container extends above the first end of the heat exchange element.

* * * * *